United States Patent

Minhas

[11] Patent Number: 5,925,270
[45] Date of Patent: Jul. 20, 1999

[54] METHOD OF MAKING ANTI-SLIP HANDLES

[75] Inventor: Kanwar A. Minhas, Plainview, N.Y.

[73] Assignee: Great Neck Saw Manufacturers, Inc., Mineola, N.Y.

[21] Appl. No.: 08/692,625

[22] Filed: Aug. 6, 1996

[51] Int. Cl.$^6$ .................................................. B23K 26/00
[52] U.S. Cl. ...................................................... 219/121.69
[58] Field of Search .................... 219/121.68, 121.69, 219/121.72; 83/875, 876; 142/40, 41; 16/110 R, 111 R; 144/365

[56] References Cited

U.S. PATENT DOCUMENTS

| | | | |
|---|---|---|---|
| 3,537,340 | 11/1970 | Westbrook | 83/875 |
| 4,229,640 | 10/1980 | Longo | 219/121.69 |
| 4,356,376 | 10/1982 | Komanduri et al. | 219/121.72 |
| 4,469,931 | 9/1984 | Macken | 219/121.72 |
| 4,709,610 | 12/1987 | Pool | 83/876 |
| 4,723,582 | 2/1988 | Caspall. | |
| 5,041,716 | 8/1991 | Wakabayashi | 219/121.68 |
| 5,225,650 | 7/1993 | Babel et al. | 219/121.69 |
| 5,368,422 | 11/1994 | Banji | 144/365 |
| 5,373,138 | 12/1994 | Locklear et al. | 219/121.69 |
| 5,416,298 | 5/1995 | Roberts | 219/121.68 |
| 5,468,932 | 11/1995 | Jacob | 219/121.69 |
| 5,535,652 | 7/1996 | Beck et al. | 142/40 |
| 5,697,282 | 12/1997 | Schakel et al. | 83/876 |
| 5,841,100 | 11/1998 | Minhas | 219/121.69 |

Primary Examiner—Geoffrey S. Evans
Attorney, Agent, or Firm—Joseph J. Previto

[57] ABSTRACT

A method of making an anti-slip handle having a gripping portion in which a plurality of notches are sliced in the gripping portion of the handle in parallel rows. The handle is rotated so that the notches can first be sliced in one row and thereafter be sliced in an additional row. The handle is further rotated to the opposite side of the gripping handle in order for the rows of notches to be sliced on opposite sides thereof. The notches may be sliced by cutting the notches with blades mounted on a lathe. Alternately, the notches may also be sliced by directing a laser beam onto the handle.

4 Claims, 2 Drawing Sheets

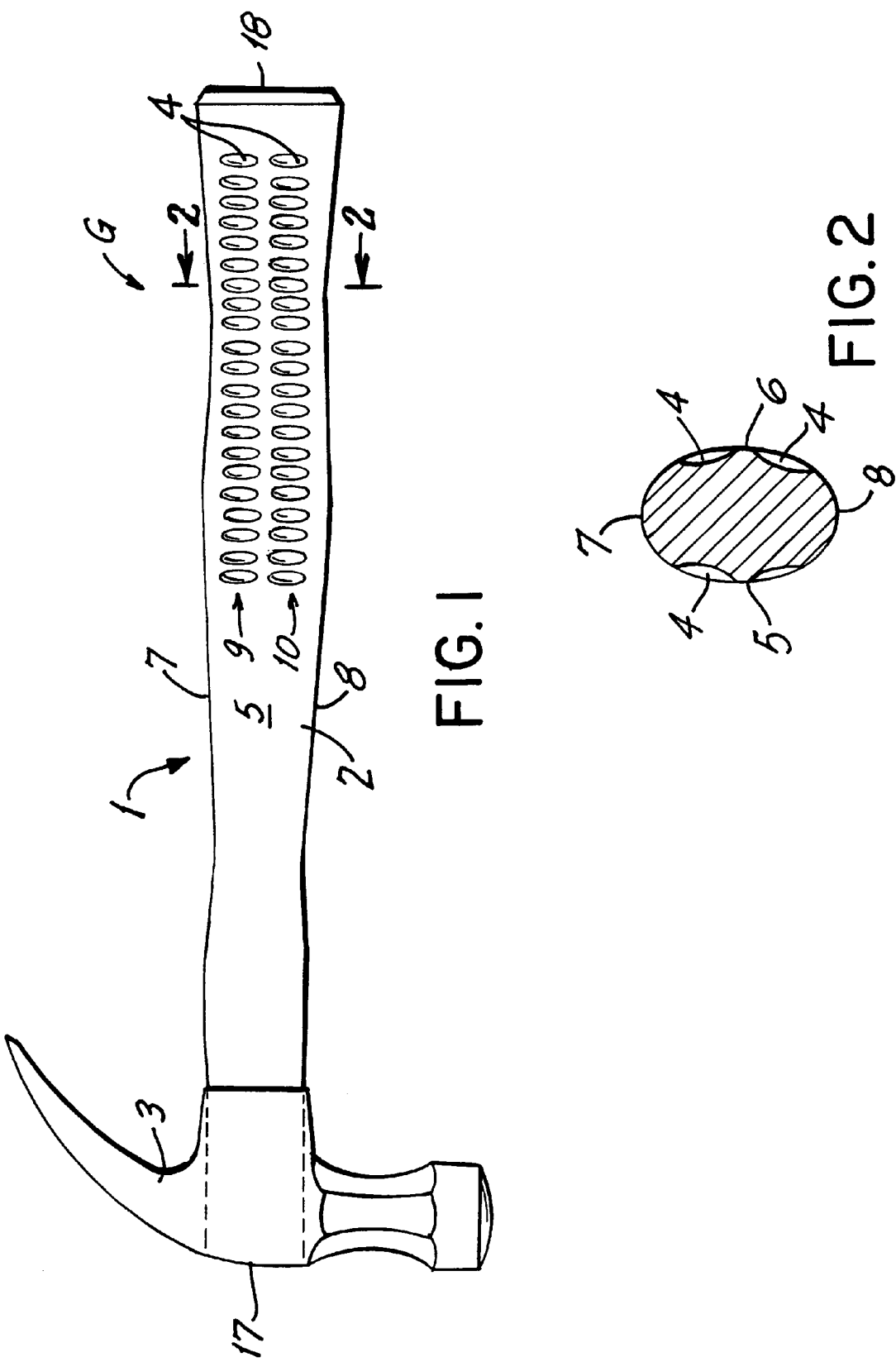

METHOD OF MAKING ANTI-SLIP HANDLES

BACKGROUND

The present invention relates to anti-slip handles for hammers and the like and more particularly to a method of making anti-slip wooden handles.

Applicant is aware of U.S. Pat. No. 4,723,582 which discloses a method of making an anti-slip wooden handle. The method described in that patent involves die-pressing a series of notches into a wooden handle at predetermined temperatures and predetermined pressures.

OBJECTS

The present invention has for one of its objects the provision of an improved mechanism and method of making an anti-slop wooden handle which is simple and inexpensive to manufacture.

Another object of the present invention is the provision of an improved mechanism and method of making an anti-slip handle which will use existing machinery.

Other and further objects will be obvious upon the understanding of the illustrative embodiment about to be described, or which will be indicated in the appended claims, and various advantages not referred to herein, will occur to one skilled in the art upon employment of the invention in practice.

This is accomplished by slicing a plurality of notches on the gripping portion of the handle. Notches are preferably in a pair of parallel of rows on each side of the handle. The slicing of the notches may be accomplished by cutting notches into the handle by a cutting mechanism, such as a knife. Alternately, the slicing may be accomplished by directing a laser beam on the handle in order to slice and form the notches in the handle.

DRAWINGS

A preferred embodiment of the invention has been chosen for purposes of illustration and description and is shown in the accompanying drawings forming a part of the specification wherein:

FIG. 1 is a plan view of a hammer showing its handle made in accordance with the present invention.

FIG. 2 is the sectional view taken along line 2—2 of FIG. 1.

DESCRIPTION

Figure 3:
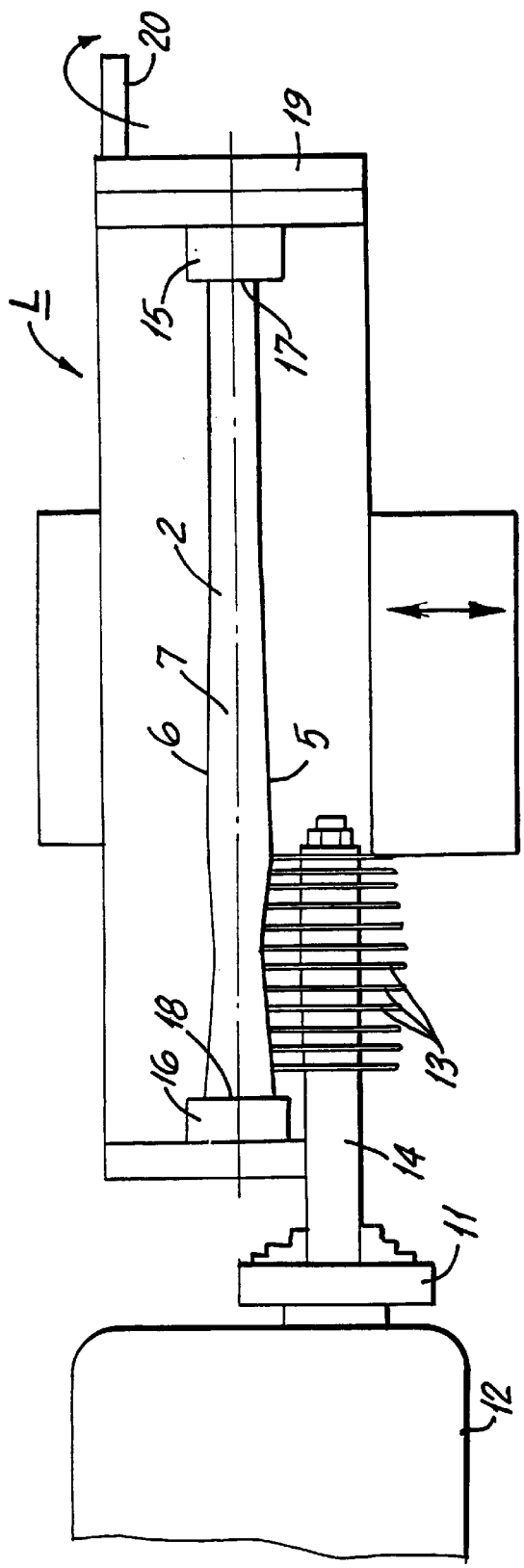
FIG. 3 is a diagrammatic view showing the method of making the handle in accordance with the present invention.

The present invention will be described in connection with a hammer 1 which comprises a wooden handle 2 to which a metal head 3 is attached. However, it will be understood that the invention will be readily applicable to other tools with handles made of wood or some other suitable material.

Referring to FIGS. 1 and 2, the handle 2 has one end 17 embedded within the head 3 and its other end 18 free. The wooden handle 2, as shown in the drawings, has a gripping portion G which is oval in cross section and comprised of a pair of opposed curved surface 5 and 6, having a long radial arc, and a pair of opposed surfaces 7 and 8, having a short radial arc, connecting the surfaces 5 and 6.

Each surface 5 and 6 of the wooden handle 2 has a plurality of notches 4 arranged thereon in a pair of substantially parallel rows 9 and 10. Preferably, the notches 4 are substantially oval shaped and are about 11 millimeters long. The notches 4 are located in two substantially parallel rows 9 and 10 which extend for about 127 millimeters along each surface 5 and 6 of the wooden handle 2 at the grip portion G. The distance between the widest portions of adjacent notches 4 in a row is about 3 millimeters and the distance between the parallel rows 5 and 6 at the centers of the notches 4 is approximately 14 millimeters. The depth of each notch 4 at its deepest (central) point is about 1 millimeter and the width of each notch 4 at its widest (central) point is about 3 millimeters. It will be understood that these dimensions may be changes without departing from the invention.

FIG. 3 shows one embodiment of the present invention in which the grooves 4 are formed on the handle 2 by slicing the grooves 4 therein, by cutting the grooves into the handle by a plurality of knives.

The wooden handle 2 is first turned and shaped to the requested size and shape as is usual in such operations. The notch forming mechanism of the present invention comprises a lathe assembly L which has a blade carrier 11 powered by a motor 12. The blade carrier 11 has a plurality of spaced blades 13 which are rotated by the motor 12 through the rotatable mounting 14 on which they are mounted. The blades 13 are of sufficient depth to permit them to be accommodated to the contours of the handle 2. The lathe assembly L has rotatable chucks 15–16 for holding the ends 17–18 of the wooden handle 2 between them and presenting the various surfaces 5 to 8 to the rotatable blades 13. The chucks 15–16 are controlled by a wheel 19 which may be rotated by an arm 20 in order to turn the wooden handle 2 to present different surfaces 5 to 8 of the wooden handle 2 to the blades 13 of the lathe L to cause the notches 4 to be formed by a slicing operation in which the blades 13 cut the notches 4 in the handle 2.

The pre-shaped wooden handle is placed between the chucks 15–16 and surface 5 on the grip portion G of the wooden handle 2 is presented to the blades 13 which are being rotated by motor 12. The surface 5 of the wooden handle 2 is presented to the blades 13 in such a position so that the blades 13 cut a first row notches 4 in the handle 2, e.g. row 9. The arm 20 on the wheel 19 is then turned slightly in order to present another part of the face 5 to the blades 13 in order for the blades 13 to cut the second row 10 of notches 4 parallel to the row 9. After this is completed, the handle 2 is rotated 180 degrees so that the other surface 6 is presented to the blades 13 and rows 9 and 10 of notches 4 can be made on the surface 6 of the handle 2. Since the surfaces of the handle 2 are curved, the notches 4 formed by the blades 13 will be oval shaped.

Figure 4:
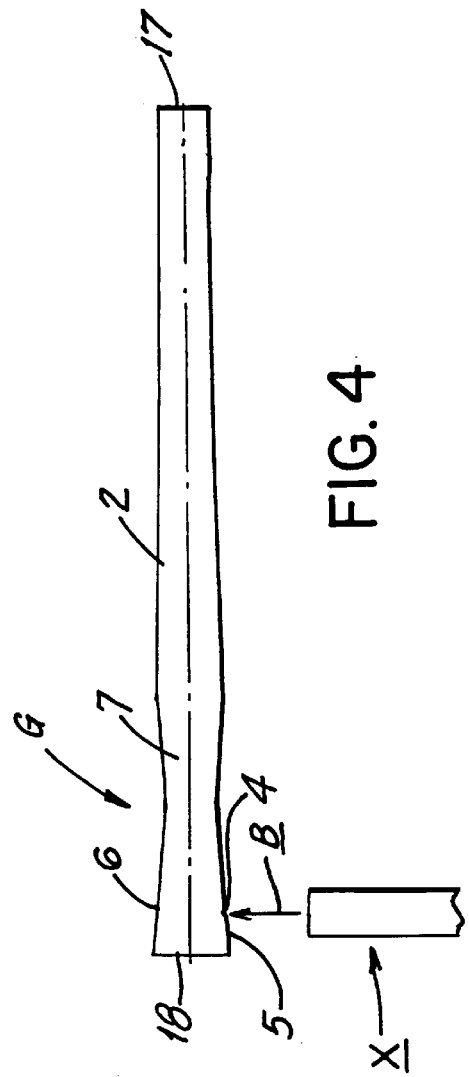
FIG. 4 is a diagrammatic view showing a modified method of making the handle of the present invention.

FIG. 4 shows another embodiment of the present invention which the notches 4 are sliced in the handle by a laser beam. In this embodiment the surfaces 5 and 6 of the handle 2 is presented to a laser beam B emitted by a laser assembly X diagrammatically indicated by an arrow. The laser beam B strikes the wooden handle 2 and forms the notches 4 therein. The laser beam B may be moved along the handle 2 in increments in order to permit the various notches 4 to be made in the handle on one surface 5. The laser beam B can then be placed on the other side of the handle 2 to apply the notches 4 on the opposite surface 6. Alternately, the laser beam B can remain stationery and the handle 2 can be manipulated and turned in a manner similar to the manner set forth in the embodiment shown in FIGS. 1–3 so that the various notches 4 can be placed on the surfaces 5 and 6 of the handle 2. Still alternately, a plurality of laser beams B may be directed to the handle 2 in order to form the spaced notches on each surfaces 5 and 6 of the handle 2. As a further alternative, the plurality of laser beams B can be positioned opposite surface 5 of the wooden handle 2 from the notches 4 and then moved opposite surface 6 from the notches 4. It is also possible for a plurality of laser beams B to be placed opposite both surfaces 5 and 6 of the handle 2 and to simultaneously form the notches 4 on both surfaces.

It will thus be seen that the present invention provides an improved mechanism and method of making an anti-slip handle which is simple and inexpensive to manufacture which will use existing machinery.

As many varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. The method of making an anti-slip handle having a gripping portion which comprises slicing a plurality of notches in the gripping portion of the handle, said notches being sliced on the handle in parallel rows, rotating said handle slightly so that the notches can first be sliced in one row on one side of the gripping handle and thereafter be sliced in a parallel row on the same side of the gripping handle, rotating said handle to the opposite side of the gripping handle in order for the rows of notches to be sliced on said opposite side in parallel rows, rotating said handle slightly so that the notches can first be sliced in one row on the opposite side of the gripping handle and thereafter to be sliced in a parallel additional row on said opposite side of the gripping handle.

2. The method as set forth in claim 1 wherein said notches are sliced by cutting the notches therein.

3. The method as set forth in claim 1 wherein said notches are sliced by directing a laser beam onto the handle.

4. The method as set forth in claim 1 wherein said notches are approximately 1 millimeter deep and are substantially oval shaped with the distance between adjacent notches in a row at their wides being approximately 3 millimeters, the length of each notch being approximately 11 millemeters, the distances between the centers of the notches in the two rows is approximately 14 millimeters, the parallel rows of notches extending along the gripping portion of the handle for approximately 127 millimeters and the width of each notch at its widest is about 3 millimeters.

* * * * *